United States Patent [19]

Brusasco

[11] Patent Number: 4,768,257
[45] Date of Patent: Sep. 6, 1988

[54] VEHICLE WINDSHIELD WIPER

[75] Inventor: Enzo Brusasco, Turin, Italy

[73] Assignee: Roltra S.p.A., Turin, Italy

[21] Appl. No.: 15,075

[22] Filed: Feb. 17, 1987

[30] Foreign Application Priority Data

Feb. 21, 1986 [IT] Italy ............................. 53012/86[U]

[51] Int. Cl.$^4$ .............................................. B60S 1/26
[52] U.S. Cl. .............................. 15/250.3; 15/250.26; 318/468; 318/282; 318/DIG. 2
[58] Field of Search ............. 15/250.26, 250.29, 250.3; 318/468, 282, DIG. 2

[56] References Cited

U.S. PATENT DOCUMENTS

| 1,584,821 | 5/1926 | Sparks | 15/250.3 |
| 2,446,393 | 8/1948 | Russell | 318/468 X R |
| 3,145,407 | 8/1964 | Page et al. | 15/250.3 |

Primary Examiner—Peter Feldman
Attorney, Agent, or Firm—Shlesinger, Arkwright & Garvey

[57] ABSTRACT

A vehicle windshield wiper, whereby a blade is supported on a lever member hinged to a fixed support and designed to swing about a pin by virtue of a linear actuator, an output member of which consists at least partially of a screw connected to an electric motor having a hollow shaft, by means of a circirculating-ball screw-nut screw coupling, and extending through the motor itself.

2 Claims, 1 Drawing Sheet

VEHICLE WINDSHIELD WIPER

SUMMARY OF THE INVENTION

The present invention relates to a windshield wiper for vehicles, in particular motor vehicles, designed to minimise manufacturing and maintenance cost, and the number of component parts involved.

With this aim in view, according to the present invention, there is provided a motor vehicle windshield wiper comprising at least a lever member mounted on a fixed fulcrum in such a manner as to turn about the same; a blade supported on the said lever member; and actuating means for swinging the said lever member about the said fulcrum; characterised by the fact that the said actuating means comprise a linear actuator, in turn, comprising an output member, an electric motor having a hollow output shaft, and a screw-nut screw coupling on which the said nut screw is integral with the said hollow shaft and the said screw constitutes a portion of the said output member and extends through the said hollow shaft.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
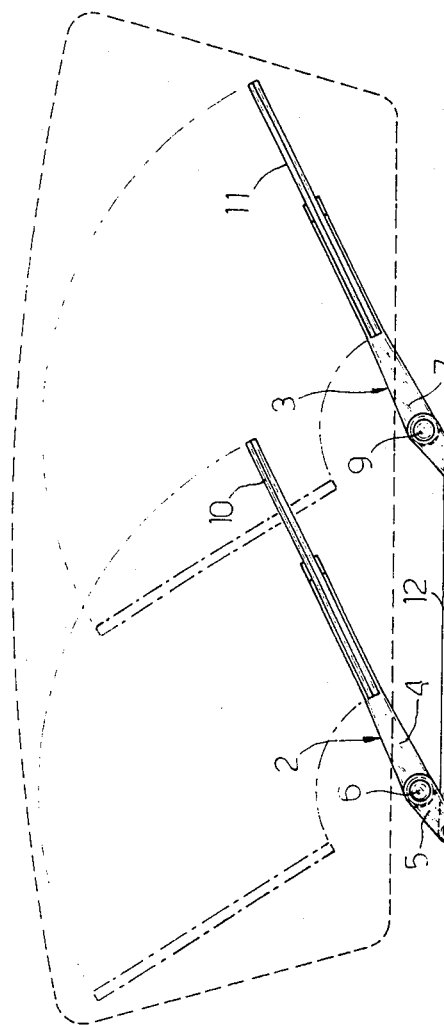
FIG. 1 shows a view of a windshield wiper according to the teachings of the present invention.

Number 1 in FIG. 1 indicates a wiper for a motor vehicle windshield 2.

Wiper 1 comprises two rocker arms 2 and 3; rocker arm 2 comprising two coaxial arms 4 and 5 extending from opposite sides of an intermediate fulcrum pin 6 mounted in a fixed position on the body (not shown) of the said motor vehicle; and rocker arm 3 comprising two coaxial arms 7 and 8 extending from opposite sides of an intermediate fulcrum pin 9 also mounted in a fixed position of the said vehicle body and parallel with pin 6. Arms 4 and 7 are fitted with respective wiper blades 10 and 11, whereas arm 8, which is longer than arm 5, is connected to the said arm 5 by means of a connecting rod 12 extending from an end pin 13 on arm 5 to a pin 14 mounted midway along arm 8 and parallel with pins 13 and 9.

Wiper 1 also comprises a linear actuator 15 substantially parallel with connecting rod 12 and supported on the said vehicle body (not shown), and a circuit 16 for activating and controlling actuator 15.

As shown in FIG. 1, arm 8 of rocker arm 3 is connected to a mobile output bracket 17 on actuator 15 by means of a hinged sliding joint 18 comprising a substantially straight slot 19, formed along an end portion of arm 8 extending beyond pin 14, and a pin 20 parallel with pin 9 and engaging slot 19 in rotary and transversely sliding manner.

Figure 2:
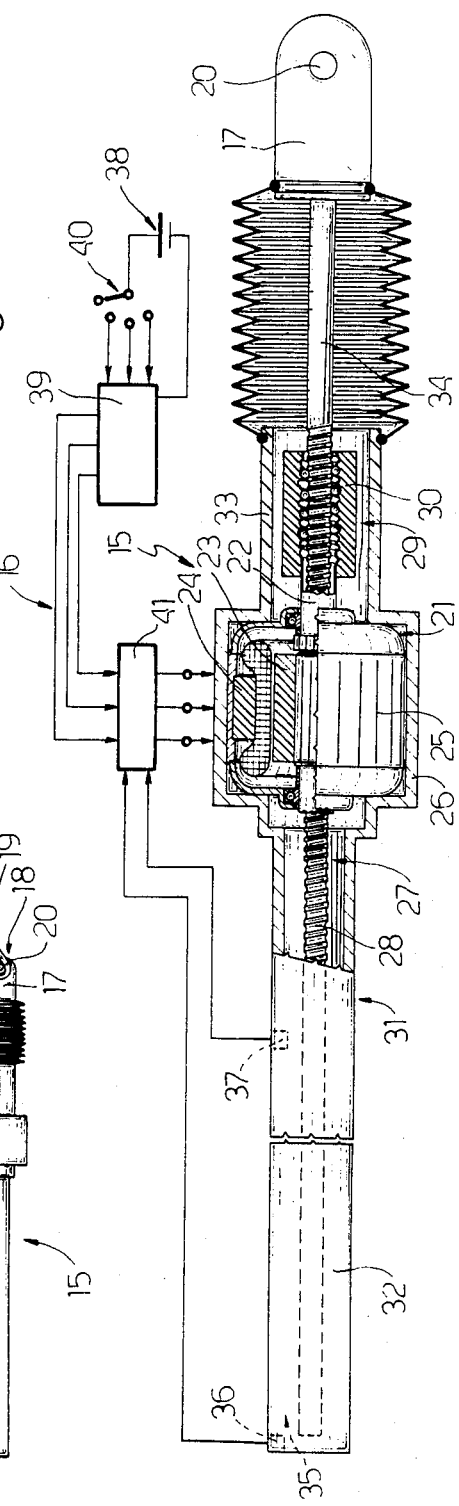
FIG. 2 shows a combined section and block diagram of a detail in FIG. 1.

As shown in FIG. 2, linear actuator 15 comprises an electric motor 21 having a central, hollow output shaft 22 and comprising a rotor 23 coaxial and integral with shaft 22, and a stator 24 integral with a casing 25 fitted inside a substantially cylindrical casing 26 coaxial with shaft 22.

Linear actuator 15 also comprises an output member 27 coaxial with shaft 22 and comprising a rigid screw 28 coaxial with and extending through shaft 22. Screw 28 is connected to shaft 22 by means of a recirculating-ball screw-nut screw coupling 29 comprising, in addition to screw 28, a nut screw 30 connected to screw 28 via the interposition of balls and connected integral with the end of shaft 22 outside motor 21.

Actuator 15 represents an outer protective casing 31 having an intermediate portion consisting of casing 26, and two end portions consisting of two tubular elements 32 and 33 coaxial with shaft 22 and through which travels screw 28. The end of screw 28 travelling along tubular element 33 is connected to a rod 34 coaxial with screw 28 and integral with bracket 17, whereas the end of screw 28 travelling along tubular element 32 presents a radial appendix 35 designed to engage two limit microswitches 36 and 37 mounted inside tubular element 32.

Microswitches 36 and 37 form part of circuit 16, which also comprises a voltage generator 38 having two poles connected to a control block 39; the first pole directly, and the second pole via a four-position switch device 40. Control block 39 is a known type available on the market and by means of which motor 21 may be operated, depending on the position of switch 40, at a first or second speed, or in intermittent mode at the said first or second speed. A known inversion block 41, also available on the market, is provided between block 39 and motor 21 and controlled by microswitches 36 and 37 so as to invert rotation of motor 21 upon screw 28 reaching either of the said two limit positions.

In actual use, operation of motor 21 is accompanied by reciprocating travel of screw 28 between the said two limit positions defined by microswitches 36 and 37, and swinging of rocker arms 2 and 3 about respective fulcrum pins 6 and 9, together with simultaneous transverse sliding of pin 20 along slot 19.

The advantages of wiper 1 will be clear from the foregoing description. In addition to presenting an extremely straightforward, compact structure, mainly due to the employment of motor 21 having a hollow shaft coaxial with and fitted through with screw 28, it is also extremely cheap, by virtue of recirculating-ball coupling 29 acting as an epicyclic reduction gear, thus enabling the employment of relatively cheap, low-power, high-speeed electric motors.

I claim:

1. A windshield wiper for a motor vehicle, comprising:
   (a) a first lever member having a free wiping end and a drive connecting end;
   (b) said wiper member having fulcrum means positioned intermediate said ends of said first lever member;
   (c) said driving end including a lost motion slot;
   (d) a pivot means positioned in said driving end between said fulcrum means and said lost motion slot;
   (e) a second lever member having a wiping end and a drive connecting end substantially parallel to said first lever member;
   (f) said second lever member having fulcrum means positioned intermediate said ends of said second lever member;
   (g) said second lever member having a pivot at said driving end on a fixed radius from said second lever member fulcrum means;

(h) a substantially horizontal linkage means having first and second ends and connecting at said second end said first lever member at said pivot means of said first lever member;
(i) said linkage means first end connecting said second lever member at said second lever member pivot means;
(j) said linkage means being angularly disposed to said substantially parallel lever members;
(k) a drive means for said windshield wiper having a first end and a second end;
(l) said drive means first end being operatively connected to said first lever member lost motion slot;
(m) said drive means being rod-like in configuration throughout its length and, when positioned in said vehicle, being substantially parallel to said linkage means;
(n) a housing for said drive means;
(o) said drive means including a screw shaft;
(p) said screw shaft having two limit positions;
(q) said drive means including, in series, a ball-nut screw, a motor, and a pair of reversal microswitches;
(r) said motor being positioned substantially intermediate of said housing;
(s) said motor including a hollow output shaft substantially coaxial with said screw shaft of said drive means and being operatively connected with said ball-nut screw;
(t) automatic control means; and
(u) said reversal microswitches being connected to said automatic control means to automatically reverse the rotation of said motor when said screw shaft reaches either of said two limit positions.

2. A windshield wiper for a motor vehicle, as in claim 1, and including;
(a) an electrical control system for controlling said motor and for interfacing with said vehicle power source.

* * * * *